(12) United States Patent
Goldenbert

(10) Patent No.: US 7,083,416 B1
(45) Date of Patent: Aug. 1, 2006

(54) CONTAMINANT-TOLERANT BRAILLE PINS

(75) Inventor: Michael Goldenbert, Melbourne Beach, FL (US)

(73) Assignee: Freedom Scientific, Inc., St. Petersburg, FL (US)

( * ) Notice: Subject to any disclaimer, the term of this patent is extended or adjusted under 35 U.S.C. 154(b) by 0 days.

(21) Appl. No.: 10/908,960

(22) Filed: Jun. 2, 2005

Related U.S. Application Data

(62) Division of application No. 10/710,808, filed on Aug. 4, 2004, now Pat. No. 6,902,403.

(51) Int. Cl.
*G09B 21/00* (2006.01)

(52) U.S. Cl. ........................... 434/113; 434/114

(58) Field of Classification Search ............... 434/112, 434/113, 114, 115, 117
See application file for complete search history.

(56) References Cited

U.S. PATENT DOCUMENTS

| | | | | |
|---|---|---|---|---|
| 3,659,354 A | * | 5/1972 | Sutherland | 434/113 |
| 3,718,991 A | * | 3/1973 | Kafafian | 434/113 |
| 4,633,121 A | * | 12/1986 | Ogawa et al. | 310/332 |
| 5,226,817 A | * | 7/1993 | Nakajima et al. | 434/113 |
| 5,842,867 A | * | 12/1998 | Hong et al. | 434/114 |
| 6,217,338 B1 | * | 4/2001 | Tieman | 434/114 |

* cited by examiner

*Primary Examiner*—Kurt Fernstrom
(74) *Attorney, Agent, or Firm*—Ronald E. Smith; Smith & Hopen, P.A.

(57) ABSTRACT

A Braille pin has three parts sharing a common longitudinal axis. A first part has a first breadth and includes a rounded tip felt by a user. A second part has a noncircular transverse cross-section and has a breadth greater than the first breadth. A first shoulder is formed by the juncture of the first and second parts. A third part has a third breadth less than the second breadth. A second shoulder is formed at the juncture of the second and third parts. A pinhole has first, second, and third sections that respectively receive the first, second and third parts of the pin. The first shoulder limits upward pin travel by abutting an overhang at the juncture of the first and second pinhole sections. The second shoulder limits downward pin travel by abutting a step at the juncture of the second and third pinhole sections.

1 Claim, 16 Drawing Sheets

CONTAMINANT-TOLERANT BRAILLE PINS

CROSS-REFERENCE TO RELATED APPLICATIONS

This disclosure is a divisional application claiming the benefit of the filing date of U.S. patent application entitled: "Contaminant-Tolerant Braille Pins," filed by the same inventor on Aug. 4, 2004, bearing Ser. No. 10/710,808 now U.S. Pat. No. 6,902,403.

BACKGROUND OF THE INVENTION

1. Field of the Invention

This invention relates, generally, to Braille pins. More particularly, it relates to a Braille pin and a pinhole or bore construction that inhibits fouling of the Braille pin by debris or contaminants.

2. Description of the Prior Art

Braille cells typically include a plurality of solid housings of parallelepiped construction. Each housing has six (6) or eight (8) pinholes or bores formed therein. Accordingly, six (6) or eight (8) Braille pins are housed in each Braille cell. The pins are arranged in two (2) columns of three (3) or four (4) pins each.

When in repose, each pin is in a retracted position where it is fully positioned within the bore formed in the housing. When not in repose, the uppermost tip of each pin, known as a Braille dot, extends from the bore where it can be felt by a user.

A Braille cell assembly is a collection of Braille cells. The pins are captive within a housing and its bore. Theoretically, the housing could be made from one housing part that serves as a base part for assembling the benders (bimorphs), circuit and pins, but this is not practical. Typically, there is at least a second part called the cap. The cap is removable and can have different heights. When combined with matching different length pins, the Braille cell assembly can be fitted to various products that have different heights. The base part of the Braille cell can be mass produced and later fitted with the appropriate height cap and pin to suit the application. The removable caps and pins facilitate serviceability of the cell as well.

The Braille pins are selectively extended by actuator means to represent Braille characters. The pins often become stuck when fouled by contaminates. When fouled, they cannot be displaced up or down reliably and the value of the Braille reader of which the pins form a part is reduced.

Thus there is a need for an improved Braille pin construction that is not fouled by ordinary amounts of debris and other contaminates.

The manufacturing of Braille readers is problematic because Braille pins are small and the bores within which they fit are also small. A single Braille cell typically includes eight (8) bores for receiving pins. Thus, even a small Braille reader having twenty (20) cells will require the manual insertion of one hundred sixty (160) Braille pins into one hundred sixty (160) bores.

A need therefore exists for an improvement in Braille pins that would facilitate the assembly of Braille readers.

However, in view of the prior art considered as a whole at the time the present invention was made, it was not obvious to those of ordinary skill in this field how the identified drawbacks of the prior art could be overcome in an effective, efficient, and economical manner.

SUMMARY OF INVENTION

The longstanding but heretofore unfulfilled need for an improved Braille pin is now met by a new, useful, and non-obvious invention.

The novel Braille pin is designed to allow contaminates to fall past areas of the pin that could create a restriction to the pin's travel. This improvement is significant because it helps prevent the sticking of Braille dots in the product and extends the time required between cleanings.

Each pin of the plurality of Braille pins has a three (3) part construction. Moreover, the bore that receives the novel Braille pin has three sections. Accordingly, each part of the pin is received within a different section of the bore. Specifically, the first part of the pin is received within the first section of the bore, the second part of the pin is received within the second section of the bore, and the third part of the pin is received within the third section of the bore.

In a preferred embodiment, each pin has a first part of solid or hollow construction having a predetermined longitudinal extent and having a circular transverse cross-section although many different cross-sections can be used to attain the advantages of this invention. The first part of the pin includes a rounded distal free end, known as a Braille dot, adapted for tactile communication with a user of the Braille reader, also known as a Braille display case, of which the novel Braille pins form a part.

A second part also has a solid or hollow construction having a predetermined longitudinal extent but its breadth is greater than that of the first part. Accordingly, a first shoulder is formed where the first and second parts meet. The transverse cross-section of the second part is independent of the transverse cross-section of the first part and may be of any predetermined geometrical configuration, including circular and non-circular.

The second part of the Braille pin provides the bearing surface of the pin, i.e., it slidingly engages the sidewall of the second section of the bore. The first and third parts of the pin are received within the first and third sections of the bore, as aforesaid, but said parts do not slidingly engage or otherwise abut their respective bore sections.

In a proposed commercial embodiment where the transverse cross-section of the second section of the pin-receiving pinhole or bore is circular, the transverse cross-section of the pin second part has four radially-extending fins or projection, the radially outermost edges of which form a minimal area of contact with the sidewall of said second section.

The transverse cross-section of the second pin part is independent of the transverse cross-section of the first or third pin parts and may be of any predetermined geometrical configuration, including circular and non-circular.

The first shoulder provides a stop means that limits upward travel of the Braille pin when it is in operation.

A third part of the pin abuts the second part and has a solid or hollow construction having a predetermined longitudinal extent. The breadth of the third part is less than the breadth of the second part. A second shoulder is therefore formed where the second and third parts meet. The second shoulder provides a stop means that limits the downward travel of the Braille pin when it is operatively disposed in a Braille cell.

The third part has a transverse cross-section of any predetermined geometrical configuration, including circular and non-circular. The transverse cross-section of the third part is independent of the transverse cross-section of the first and second parts.

In all embodiments where the pinhole or bore has a second section having a transverse cross-section of circular configuration, for example, the second pin part may have a transverse cross-section of any non-circular geometric configuration in addition to said star-shape such as fluted, triangular, pentagonal, hexagonal, oval, oblong, straight, crescent, six-pointed star-shaped or the like, it being understood that the number of possible geometric configurations is theoretically though not practically unlimited. The primary advantage afforded by this invention resides in the dissimilarity of the transverse cross-section of the bore and a pin disposed within said bore so that contact surface area is minimized.

In embodiments where the transverse cross-section of the second section of the pinhole or bore is non-circular, the second pin part can have a cylindrical construction and thus has a circular transverse cross-section.

The user feels the tip or Braille dot when the pin is extended, i.e., displaced from its position of repose by an actuated bimorph reed.

The Braille pins may be formed independently of one another as in the prior art or they may be formed innovatively in connected relation to a common structure so that one set of connected Braille pins is adapted to fit within one Braille cell. In the latter embodiment, eight Braille pins are releasably connected to a common neck that extends from a base so that individual pins of the set of connected Braille pins are detachable from said common neck after being collectively placed into respective pinholes of a Braille cell. More particularly, the Braille pins can be molded with a breakaway membrane to greatly reduce the time required to load individual pins. This enables each set of eight (8) Braille pins to be inserted into a Braille cell at one time. Therefore, instead of individually loading one hundred sixty (160) pins into one hundred sixty (160) bores, an assembler performs only twenty (20) assembly operations. Thus, the same number of pins is installed in one-eighth as much time.

In a variation of each embodiment, the second part of the Braille pin is circular in transverse cross-section and the first and third parts have transverse cross-sections of any predetermined geometrical configuration. In this variation, the transverse cross-section of the second section of the pinholes or bores that slidingly receives said third part may have any non-circular configuration.

It should be understood that the respective transverse cross-sectional shapes of the non surface-bearing parts of a pin, i.e., its first and third parts, have no substantial effect on the performance of the pin. Again, the transverse cross-sectional shape of the second part, the surface-bearing part, is the cross-sectional shape that most affects the performance of the pin.

In all embodiments, the increase in breadth of the second section of the bore relative to the breadth of the first section creates an overhang that substantially prevents debris or other contaminates from reaching the bearing surface of the pin.

Moreover, the mismatching of the respective cross-sections of the respective second parts of the Braille pins and their associated second sections of the pinholes or bores reduces the area of surface contact between said second pin parts and said second bore sections, thereby enabling operation of the Braille pins even when the pin bores have been contaminated by debris.

More particularly, the contact points where the non-circular second part of a pin frictionally engages a circular second section of a bore (or where a non circular second section of a bore frictionally engages a cylindrical second part of a pin) may form a knife-like edge. Large voids between the bore contact or bearing surface (the sidewall of the second section of the bore) and the pin body (the hub from which the fins or projections radiate) provide a path for debris to pass through while avoiding the sensitive bearing surface.

The invention in broad form is thus understood to include a novel Braille pin having a first part with a transverse cross-section of any predetermined geometrical configuration and a second part having a transverse cross-section of any predetermined geometrical configuration where the second part has a breadth greater than a breadth of the first part. A first shoulder is formed at a juncture of the first part and the second part. A bore slideably receives the Braille pin and said bore has a first section for slideably receiving the first part of the Braille pin with a first clearance and a second section for slideably receiving the second part of the Braille pin with a second clearance. The second section of the bore has a transverse cross-section substantially different from the transverse cross-section of the pin second part. The first clearance is greater than the second clearance. The second section has sidewalls that define a bearing surface for the second part of the Braille pin and an overhang is formed at a juncture of the first and second sections. The overhang limits travel of the Braille pin when the first shoulder abuts the overhang.

An important advantage of the novel bore construction is provided by the overhang that provides an unobstructed path of travel for debris to fall through, thereby minimizing the probability that debris will foul the critical bearing surface.

An important advantage of the novel pin construction resides in its ability to continue to operate even when the pinhole or bore is contaminated with debris.

Another closely related advantage of the novel Braille pin is provided by the reduced-in-area surfaces of contact between the pin's second part and the bore's second section which minimizes the probability that debris will be trapped between the second part of the pin and the bearing surface of the bore.

Still another advantage is realized by the reduction in assembly time made possible by the provision of a base and neck to which is releasably mounted a plurality of the novel pins.

The aforesaid advantage also facilitates the manufacturing of the Braille pins in that it is easier and more economical to manufacture sets of eight (8) interconnected Braille pins than it is to manufacture said Braille pins individually.

These and other important advantages and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
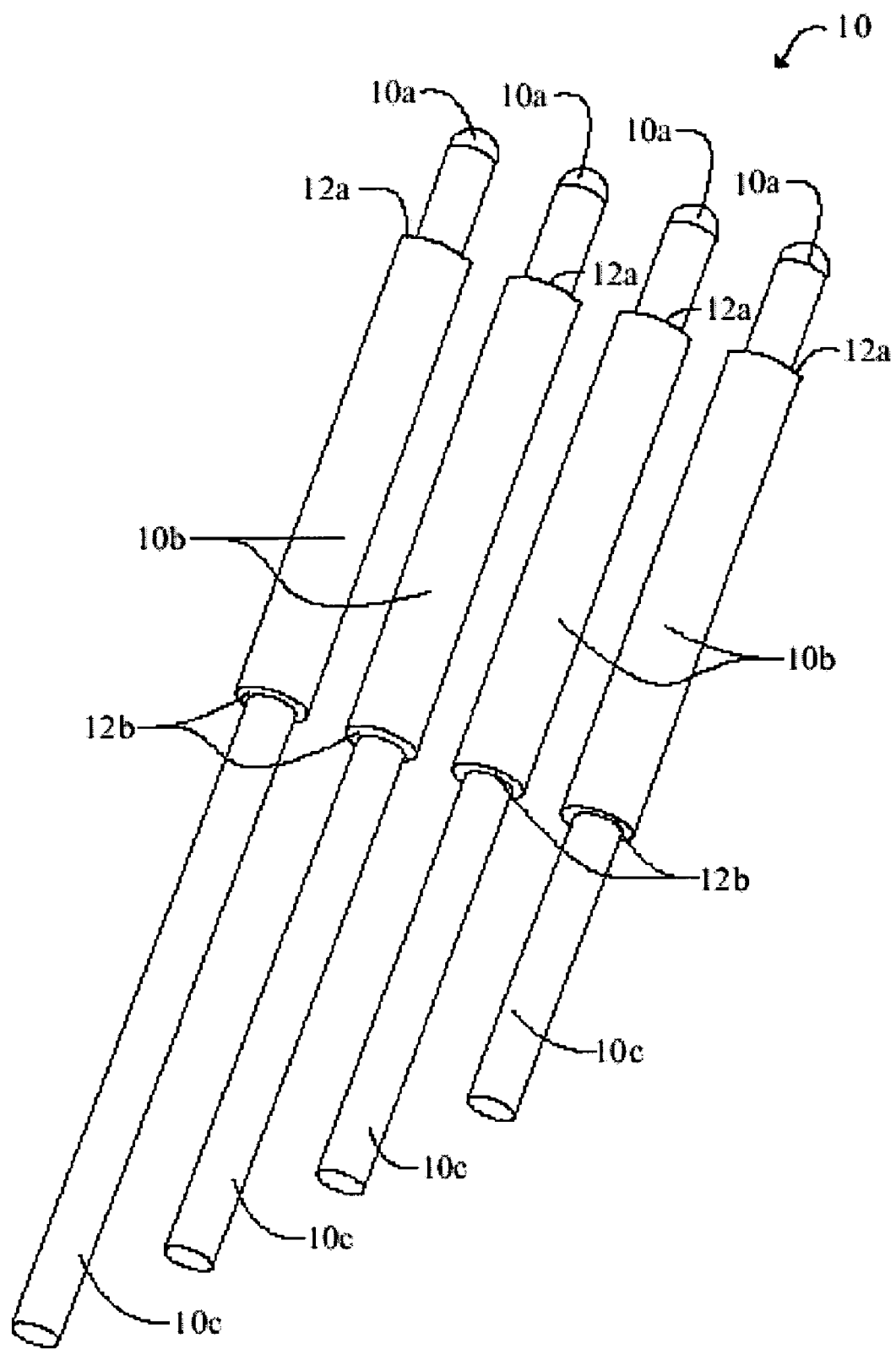
FIG. 1 is a perspective view of a set of four (4) Braille pins of a first embodiment of Braille pins that share a common construction and differ from one another only in the length dimension.

Referring now to FIG. 1, it will there be seen that a first embodiment of four (4) Braille pins of differing lengths is denoted as a whole by the reference numeral 10.

Pins 10 may be manufactured individually as depicted in FIG. 1. However, individual manufacture of pins 10 is sometimes problematic. Moreover, each individual pin must be placed painstakingly into a pinhole or bore of a Braille cell.

Figure 2A:
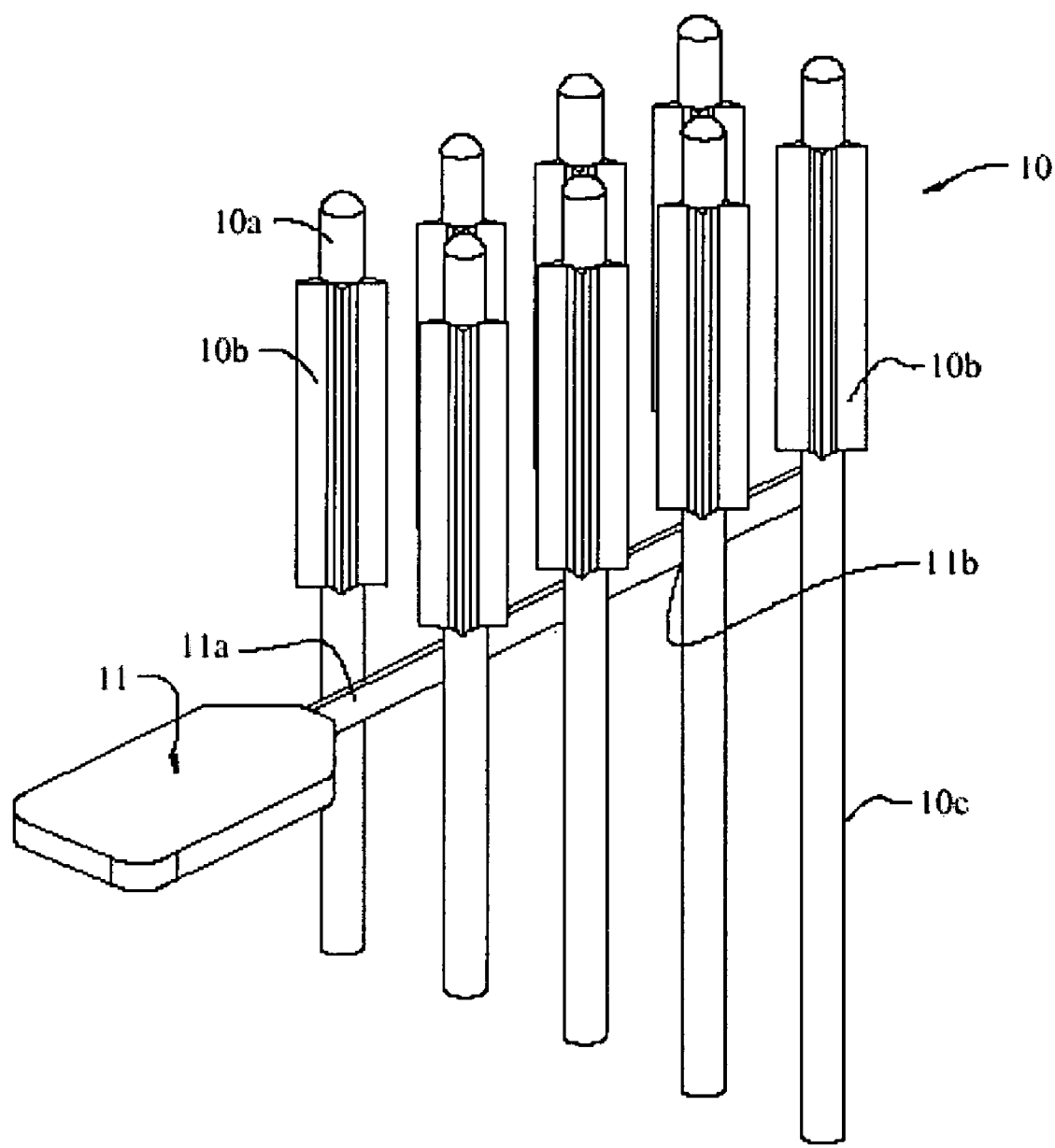
FIG. 2A is a perspective view of a plurality of Braille pins of a second embodiment that are interconnected to one another by a neck member to facilitate manufacturing of said Braille pins.
Figure 2B:
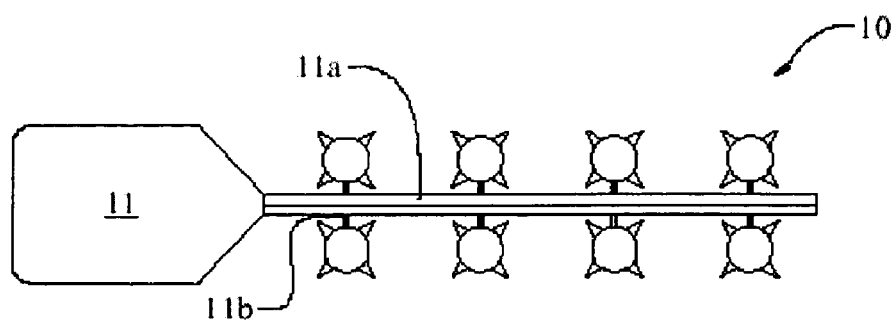
FIG. 2B is a top plan view thereof.
Figure 2C:
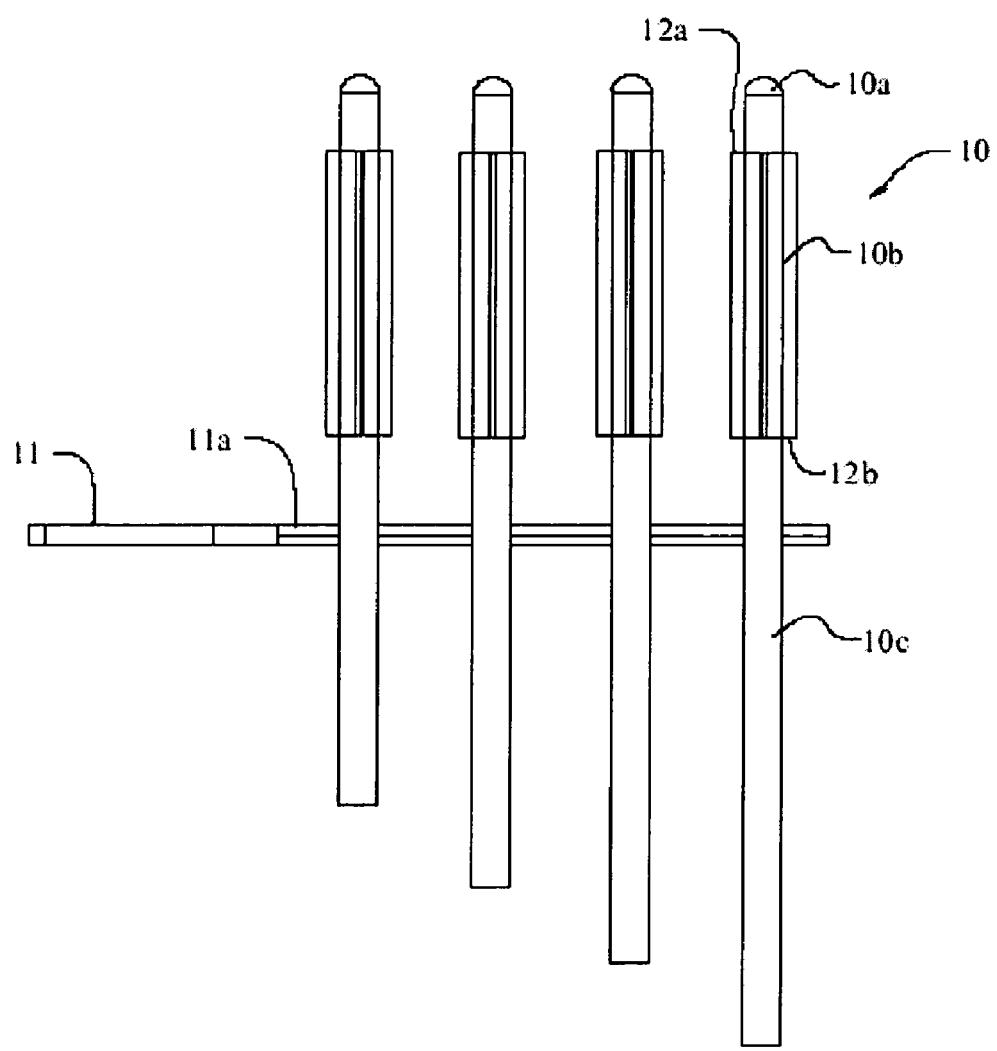
FIG. 2C is a side elevational view thereof.

In the alternative, Braille pins 10 are manufactured in connected-together groups of eight (8) as depicted in FIGS. 2A–C. A second embodiment of said Braille pins is depicted in said FIGS. 2A–C.

Each pin is easily separated from neck 11a of base 11 by breaking fragile connector 11b. The pins of the FIGS. 2A–C embodiment are placed into their respective Braille cell pinholes or bores as a whole, i.e., while still connected to neck 11a. The pins are then separated from neck 11a after insertion into their respective pinholes or bores. The pins are less expensive to manufacture when molded eight (8) at a time, and they are easier to insert into a Braille cell when connected to a common base.

Each pin 10 has a solid or hollow construction and includes three (3) parts that share a common longitudinal axis of symmetry.

First part 10a has a solid or hollow construction or predetermined longitudinal extent. It may have a transverse cross-section of any predetermined geometrical configuration including circular or non-circular. First part 10a is a nonbearing surface and the shape of its transverse cross-section may take any form without affecting the performance of pin 10.

First part 10a is the part of the pin that extends upwardly when the pin is actuated by a pin-actuating means. The distal free end of part 10a is known as the "dot" because a user of a Braille reader feels said "dot" when said pin is actuated. When a pin is not actuated, the distal end or "dot" is retracted within or lies flush with the surface of a cap that forms a part of a Braille reader, not shown.

Second part 10b has a solid or hollow construction of any predetermined longitudinal extent. It may have a transverse cross-section of any predetermined geometrical configuration including circular or non-circular.

The breadth of second part 10b is greater than the breadth of first part 10a, thereby creating first shoulder 12a.

The radially outermost surface of second part 10b is the bearing surface of the pin and its transverse cross-sectional shape affects the operation of the Braille pin.

Third part 10c has a breadth less than the breadth of second part 10b. Accordingly, second shoulder 12b is created by said difference in breadths.

In a preferred embodiment, the diameter or breadth of the first and third parts 10a and 10c are substantially equal to one another. Moreover, second part 10b, in a preferred embodiment, is formed of a hub having substantially the same diameter as said first and third parts, with fins, projections, or other protuberances of any shape radiating outwardly from said hub. Thus, when it is said that the diameter or breadth of the second part exceeds that of the first and third parts, it should be understood that the diameter of breadth referred to is that of the fins or other projections that radiate outwardly from the hub.

In a first embodiment, however, as depicted in FIG. 1, second part 10b is of cylindrical configuration and therefore has a circular transverse cross-section. As will become clear as this disclosure continues, this first embodiment is not the preferred embodiment and has utility only in connection with bores or pinholes of non-circular transverse cross-section.

In the second embodiment of FIGS. 2A–C, second part 10b has a non-cylindrical configuration. More particularly, second part 10b has a transverse cross section that includes four (4) ridges extending radially outwardly from a cylindrical hub or base along the extent of said hub or base, as best depicted in FIG. 2B. The ridges need not extend along the entire extent of the hub or base of second part 10b of Braille pin 10.

Figure 3:
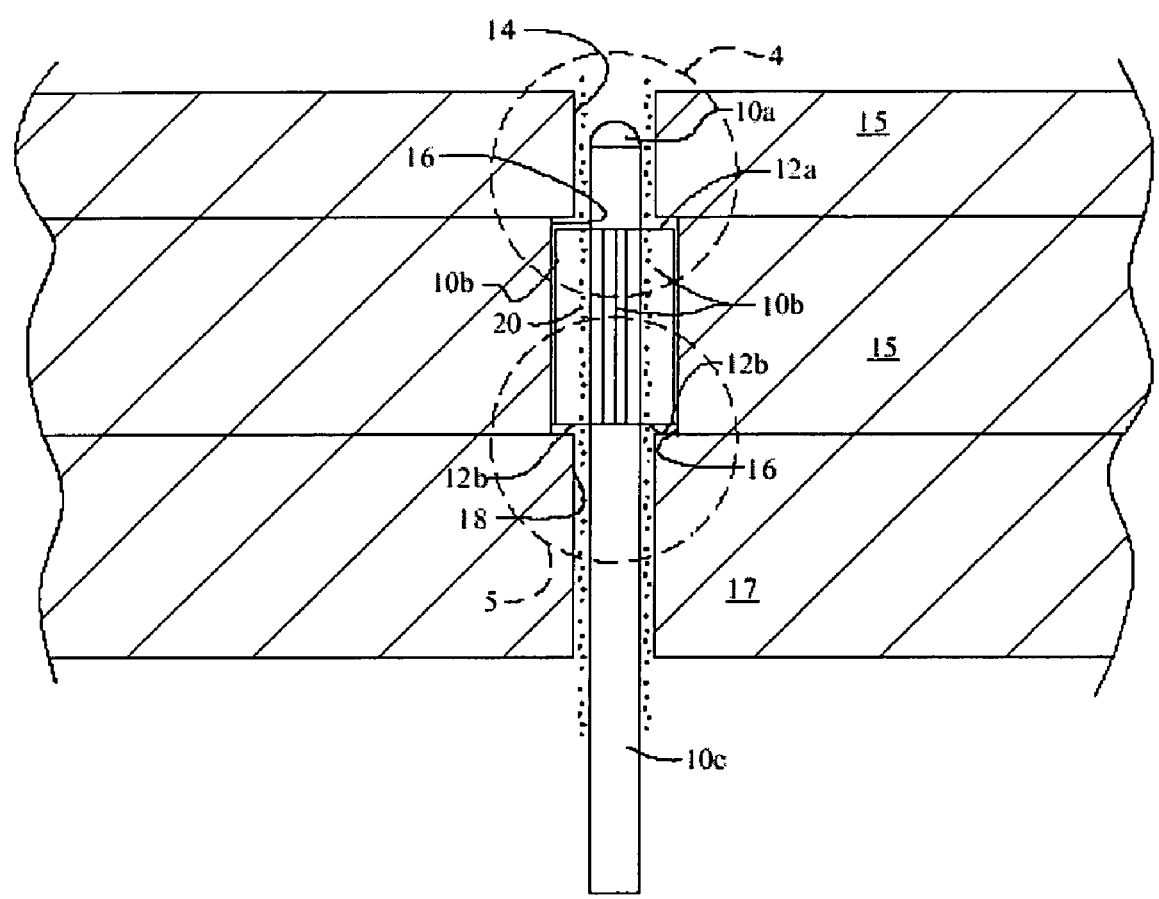
FIG. 3 is a side elevational view of a pin and a cross-sectional view of the cap and chassis within which is formed the bore that receives the pin.

Significantly, the pinhole or bore that receives the novel Braille pin has three parts. As depicted in FIG. 3, a first section 14 of said bore has a diameter that receives first part 10a of the Braille pin. Second section 16 of the bore has a diameter greater than the diameter of first part 14 and receives second part 10b of the Braille pin. Third section 18 of the bore has a diameter less than the diameter of second section 16 and receives third part 10c of Braille pin 10.

An overhang is therefore created where bore first section 14 meets bore second section 16. A step is created where second section 16 meets third section 18.

Figure 4:
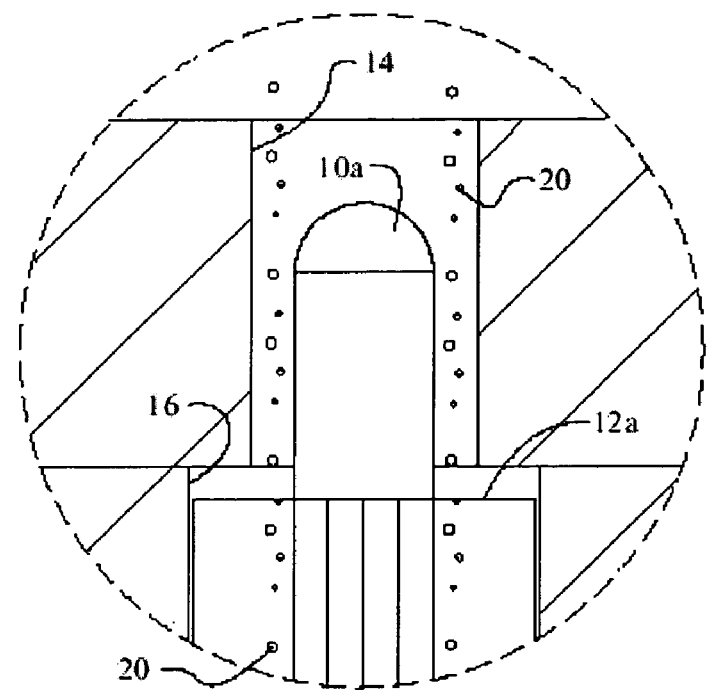
FIG. 4 is an enlarged view of the circled area denoted 4 in FIG. 3.
Figure 5:
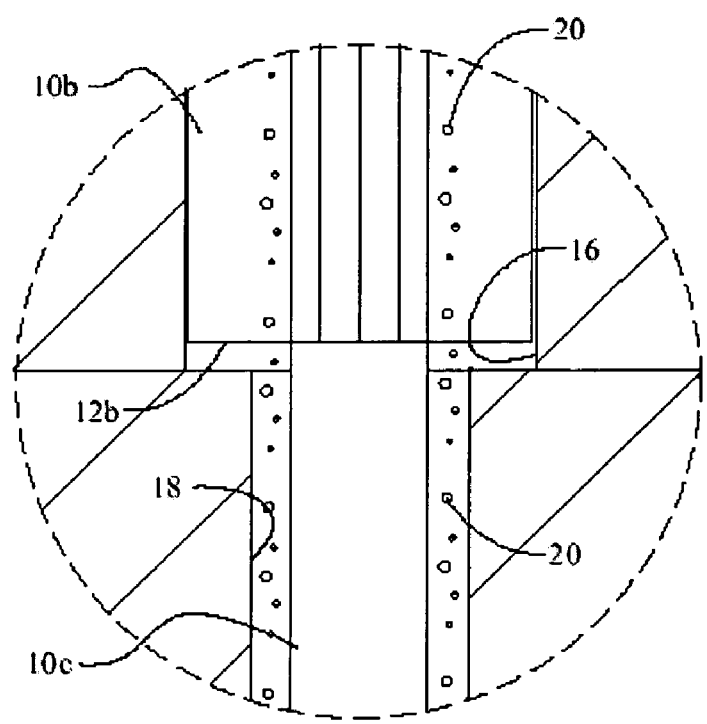
FIG. 5 is an enlarged view of the circled area denoted 5 in FIG. 3.

If debris 20 enters into first section 14 of the pin-receiving bore, said debris falls straight through said bore as depicted in FIGS. 3–5. The debris cannot change directions and flow radially outwardly towards the sidewalls of section 16 of the bore. As mentioned above, the hub or base of second part 10b of Braille pin 10 shares a common diameter with parts 10a and 10c of said Braille pin. It may be possible for some debris 20 to accumulate atop a ridge, fin, or other projection that extends radially outwardly from said hub or base but most debris will follow the downward path of travel depicted in FIGS. 3–5. Accordingly, no significant amount of debris can get between the radially outermost edges of the fins or projections formed in second part 10b and the sidewall of second bore section 16. This minimizes the chances of pin 10 being lodged within the bore for any reason attributable to debris.

The sidewall of bore second section 16 is the bearing surface for the radially outermost ends of the fins or other projections of second part 10b of Braille pin 10. Each fin or other projection forms a point when viewed in plan view, thereby forming a line contact against the sidewall of section 16 when pin 10 travels up and down when actuated and de-actuated, respectively. Thus, any debris that may find a way to get between the outermost ends of said fins and the sidewall of section 16 will be cut through by said sharp-edged fins.

If second part 10b of Braille pin 10 is cylindrical in configuration as in the embodiment of FIG. 1, debris 20 would collect atop said second part 10b. As long as said debris continues to collect atop said second part 10b, said debris cannot jam the pin by entering between the radially outermost ends of the fins or other projections and the sidewall of bore section 16. Nor can the debris fall through the pin-receiving bore.

Figure 6:
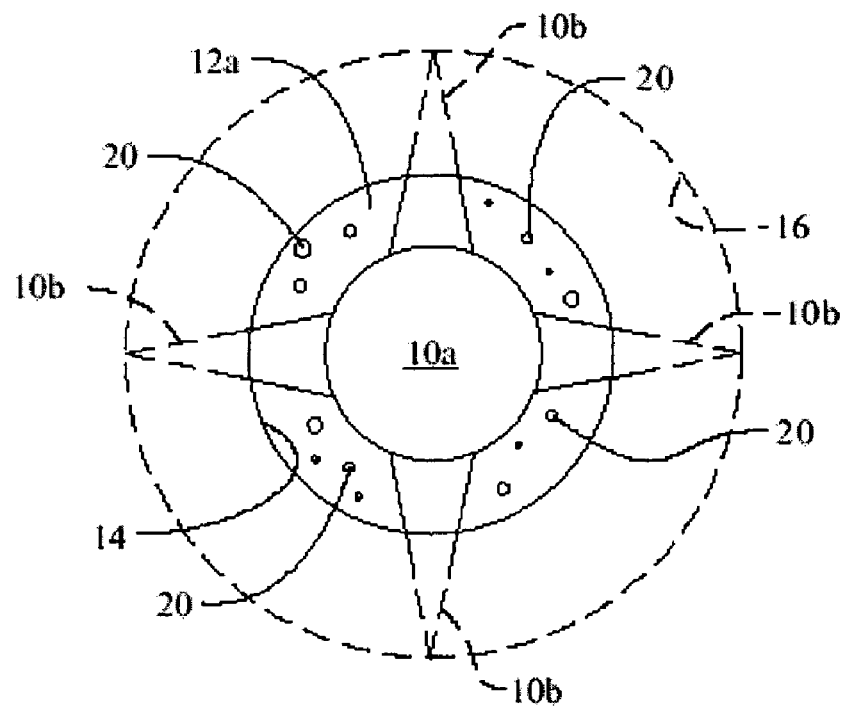
FIG. 6 is a sectional view taken along line 6—6 in FIG. 4.
Figure 7:
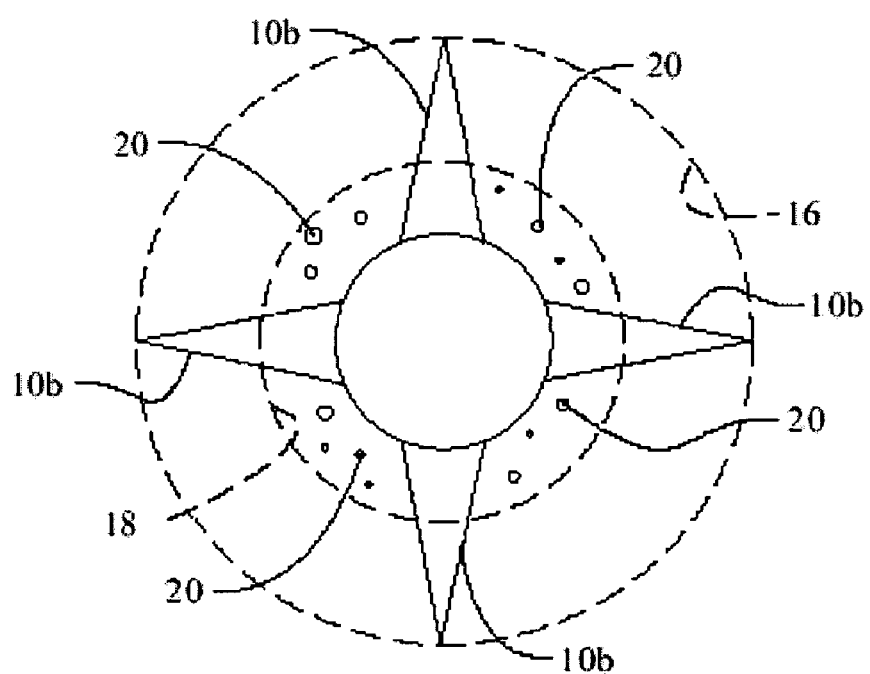
FIG. 7 is a sectional view taken along line 7—7 in FIG. 5.

However, where second part 10b of pin 10 has a non-cylindrical cross-section, debris 20 falls through the pin-receiving bore as indicated in FIGS. 3–5 as aforesaid and as also made clear by the sectional views of FIGS. 6 and 7.

Figure 8A:
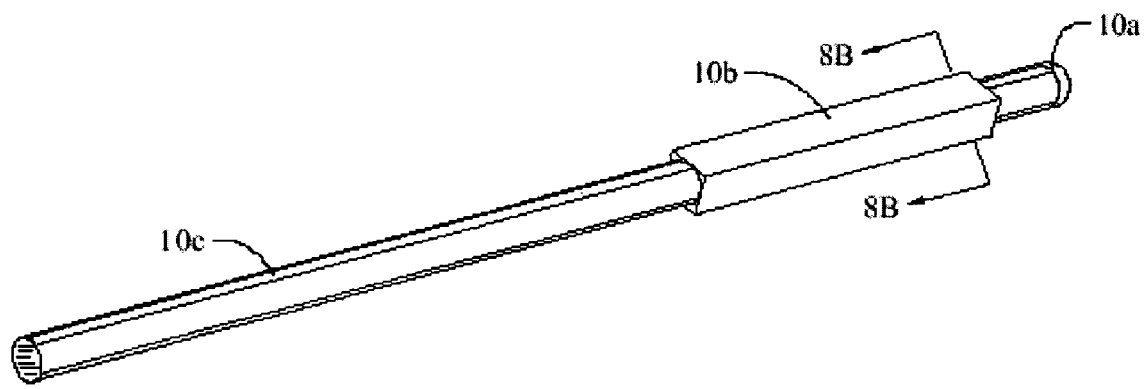
FIG. 8A is a perspective view of a third embodiment of the novel Braille pin.
Figure 8B:
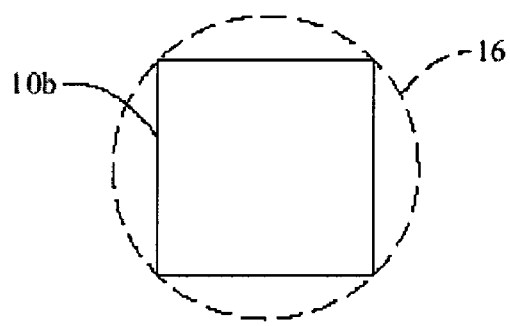
FIG. 8B is a sectional view taken along line 8B—8B in FIG. 8A.

In a third embodiment, the transverse cross-sectional shape of second part 10b is square as depicted in FIGS. 8A and 8B. Said second part 10b is slideably received with a circular in cross-section second section 16 of a pin-receiving bore.

Figure 8C:
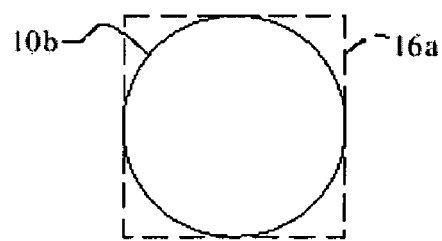
FIG. 8C is a sectional view of the first embodiment of the novel Braille pin when disposed in a square pinhole.

In a variation of the third embodiment, depicted in FIG. 8C, second part 10b has a cylindrical construction and hence a circular transverse cross-section. It is slidingly received in a bore or pinhole having a second section 16a that is square in transverse cross-section.

Figure 9A:
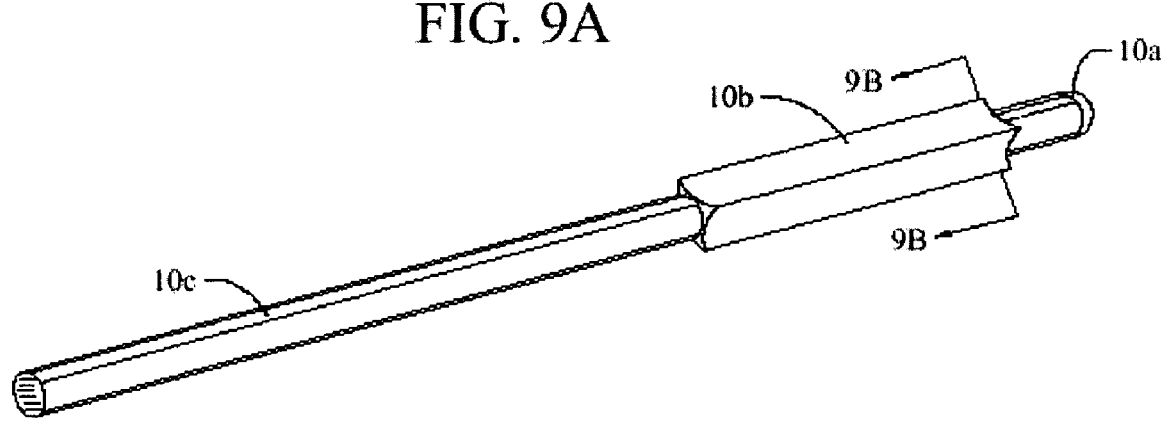
FIG. 9A is a perspective view of a fourth embodiment of the novel Braille pin.
Figure 9B:
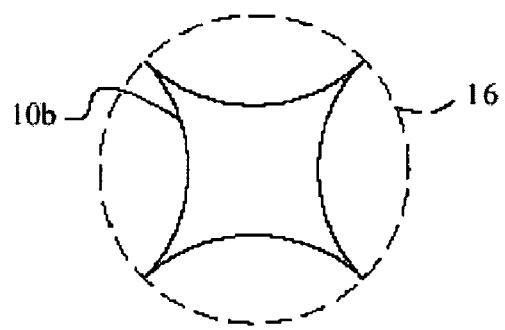
FIG. 9B is a sectional view taken along line 9B—9B in FIG. 9A.

In a fourth embodiment, the transverse cross-sectional shape of second part 10b is fluted as depicted in FIGS. 9A and 9B. Said second part 10b is slideably received with a circular in cross-section second section 16 of a pin-receiving bore.

Figure 9C:
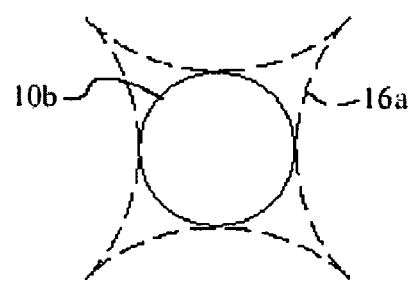
FIG. 9C is a sectional view of the first embodiment of the novel Braille pin when disposed in a fluted pinhole.

In a variation of the fourth embodiment, depicted in FIG. 9C, second part 10b has a cylindrical construction and hence a circular transverse cross-section. It is slidingly received in a bore or pinhole having a second section 16a that is fluted in transverse cross-section.

Figure 10A:
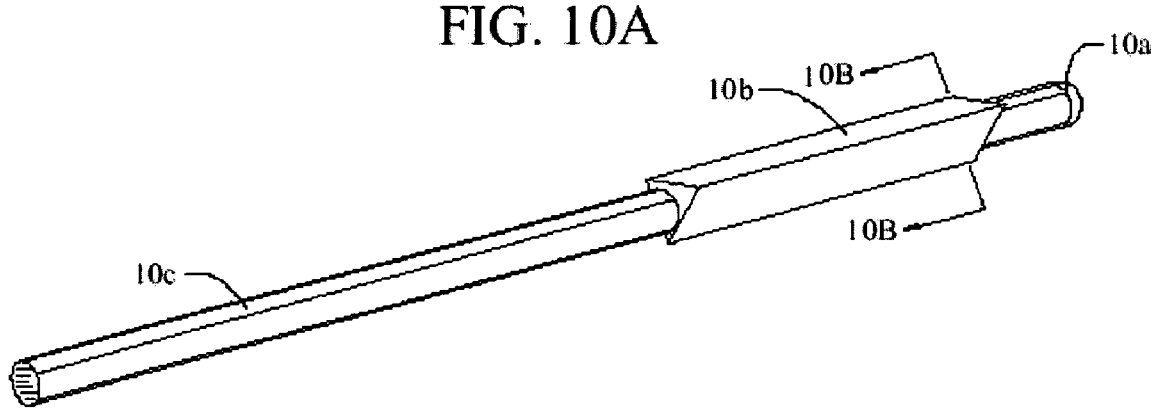
FIG. 10A is a perspective view of a fifth embodiment of the novel Braille pin.
Figure 10B:
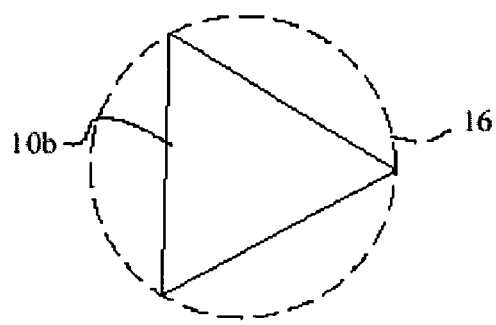
FIG. 10B is a sectional view taken along line 10B—10B in FIG. 10A.

In a fifth embodiment, the transverse cross-sectional shape of second part 10b is triangular as depicted in FIGS. 10A and 10B. Said second part 10b is slideably received with a circular in cross-section second section 16 of a pin-receiving bore.

Figure 10C:
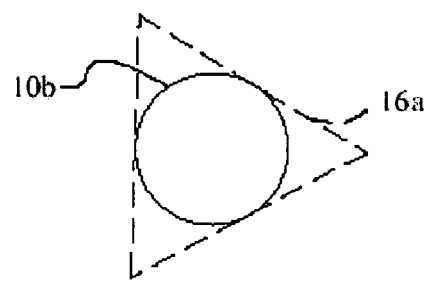
FIG. 10C is a sectional view of the first embodiment of the novel Braille pin when disposed in a triangular pinhole.

In a variation of the fifth embodiment, depicted in FIG. 10C, second part 10b has a cylindrical construction and hence a circular transverse cross-section. It is slidingly received in a bore or pinhole having a second section 16a that is triangular in transverse cross-section.

Figure 11A:
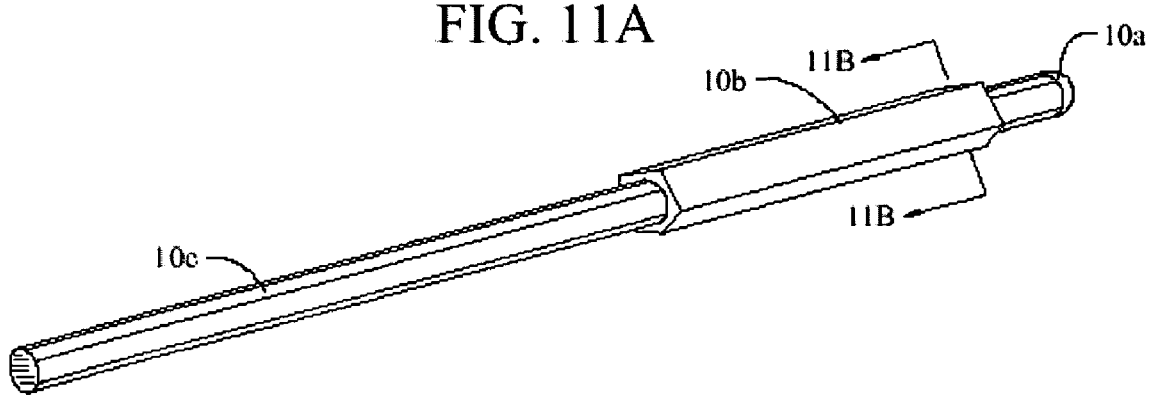
FIG. 11A is a perspective view of a sixth embodiment of the novel Braille pin.
Figure 11B:
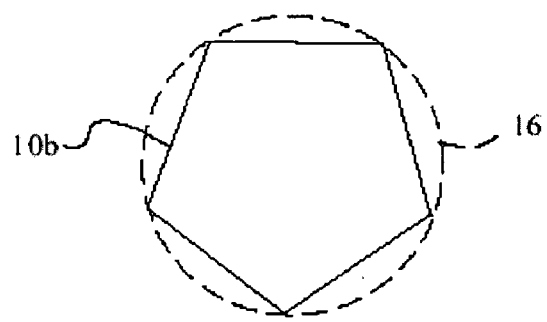
FIG. 11B is a sectional view taken along line 11B—11B in FIG. 11A.

In a sixth embodiment, the transverse cross-sectional shape of second part 10b is pentagonal as depicted in FIGS. 11A and 11B. Said second part 10b is slideably received with a circular in cross-section second section 16 of a pin-receiving bore.

Figure 11C:
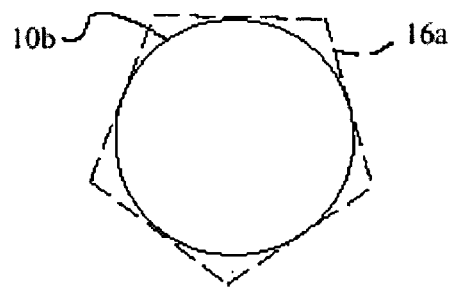
FIG. 11C is a sectional view of the first embodiment of the novel Braille pin when disposed in a pentagonal pinhole.

In a variation of the sixth embodiment, depicted in FIG. 11C, second part 10b has a cylindrical construction and hence a circular transverse cross-section. It is slidingly received in a bore or pinhole having a second section 16a that is pentagonal in transverse cross-section.

Figure 12A:
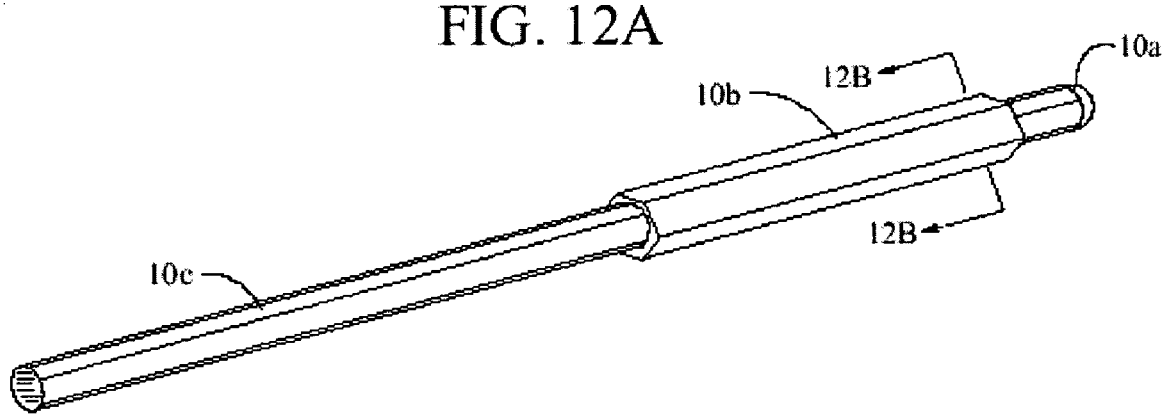
FIG. 12A is a perspective view of a seventh embodiment of the novel Braille pin.
Figure 12B:
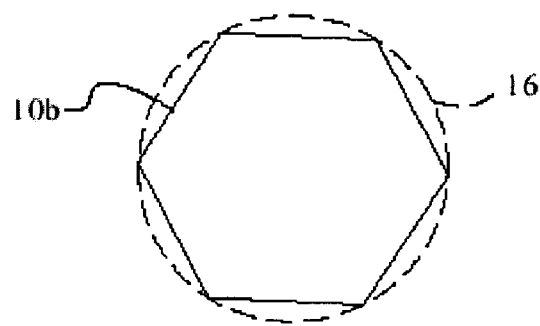
FIG. 12B is a sectional view taken along line 12B—12B in FIG. 12A.

In a seventh embodiment, the transverse cross-sectional shape of second part 10b is hexagonal as depicted in FIGS. 12A and 12B. Said second part 10b is slideably received with a circular in cross-section second section 16 of a pin-receiving bore.

Figure 12C:
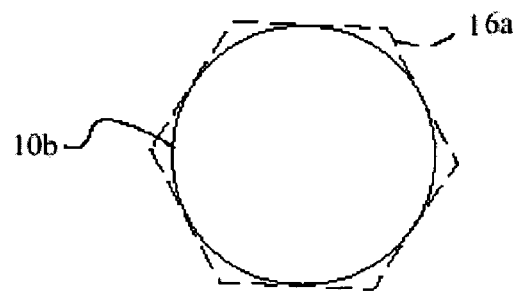
FIG. 12C is a sectional view of the first embodiment of the novel Braille pin when disposed in a hexagonal pinhole.

In a variation of the seventh embodiment, depicted in FIG. 12C, second part 10b has a cylindrical construction and hence a circular transverse cross-section. It is slidingly received in a bore or pinhole having a second section 16a that is hexagonal in transverse cross-section.

Figure 13A:
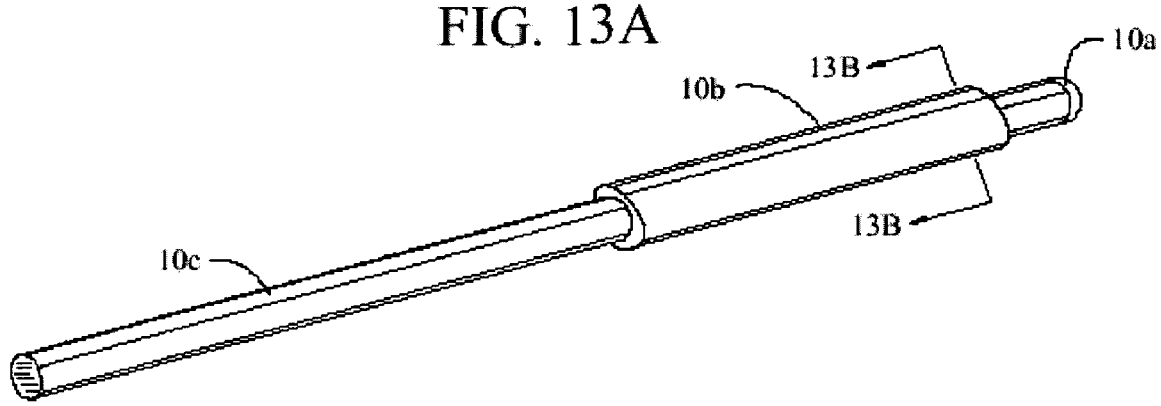
FIG. 13A is a perspective view of an eighth first embodiment of the novel Braille pin.
Figure 13B:
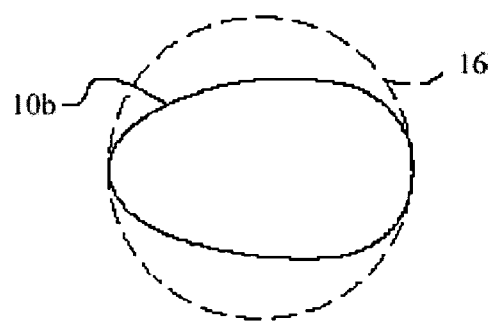
FIG. 13B is a sectional view taken along line 13B—13B in FIG. 13A.

In an eighth embodiment, the transverse cross-sectional shape of second part 10b is oval as depicted in FIGS. 13A and 13B. Said second part 10b is slideably received with a circular in cross-section second section 16 of a pin-receiving bore.

Figure 13C:
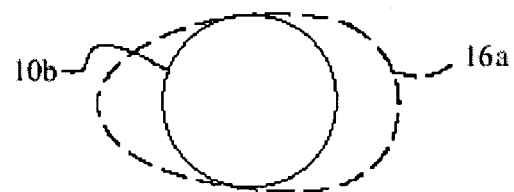
FIG. 13C is a sectional view of the first embodiment of the novel Braille pin when disposed in an oval pinhole.

In a variation of the eighth embodiment, depicted in FIG. 13C, second part 10b has a cylindrical construction and hence a circular transverse cross-section. It is slidingly received in a bore or pinhole having a second section 16a that is oval in transverse cross-section.

Figure 14A:
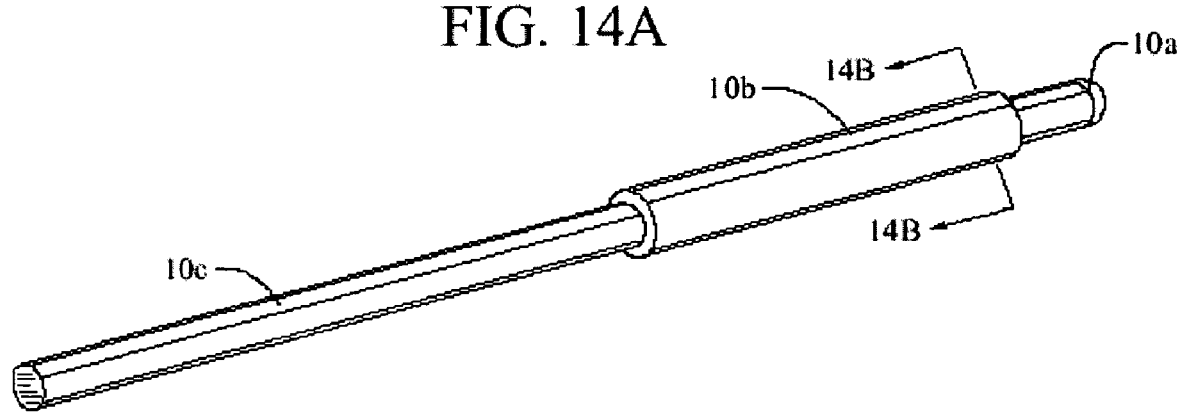
FIG. 14A is a perspective view of a ninth embodiment of the novel Braille pin.
Figure 14B:
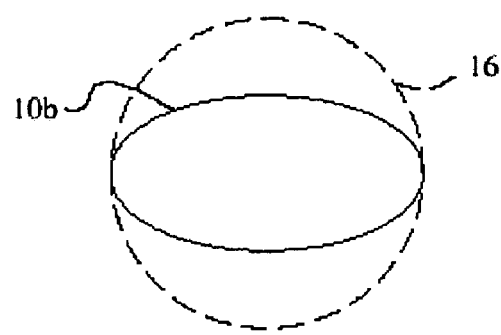
FIG. 14B is a sectional view taken along line 14B—14B in FIG. 14A.

In a ninth embodiment, the transverse cross-sectional shape of second part 10b is elliptical as depicted in FIGS. 14A and 14B. Said second part 10b is slideably received with a circular in cross-section second section 16 of a pin-receiving bore.

Figure 14C:
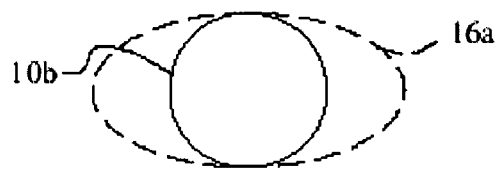
FIG. 14C is a sectional view of the first embodiment of the novel Braille pin when disposed in an elliptical pinhole.

In a variation of the ninth embodiment, depicted in FIG. 14C, second part 10b has a cylindrical construction and hence a circular transverse cross-section. It is slidingly received in a bore or pinhole having a second section 16a that is elliptical in transverse cross-section.

Figure 15A:
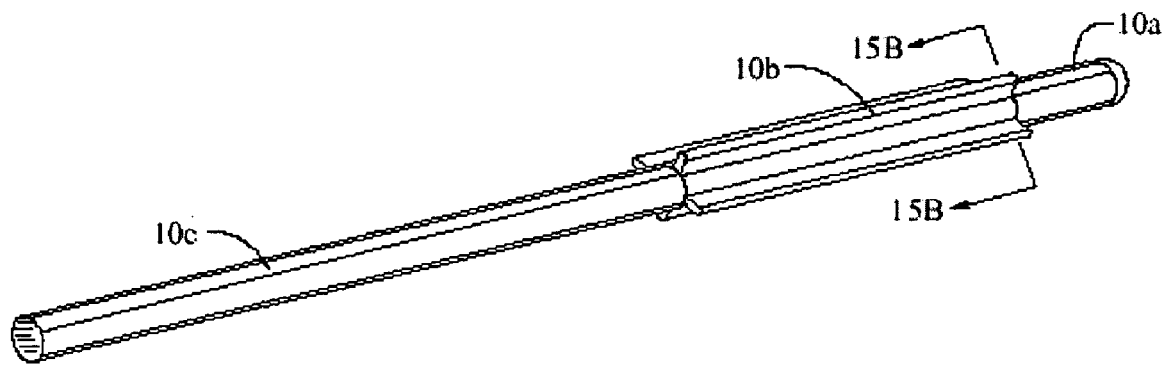
FIG. 15A is a perspective view of a tenth embodiment of the novel Braille pin.
Figure 15B:
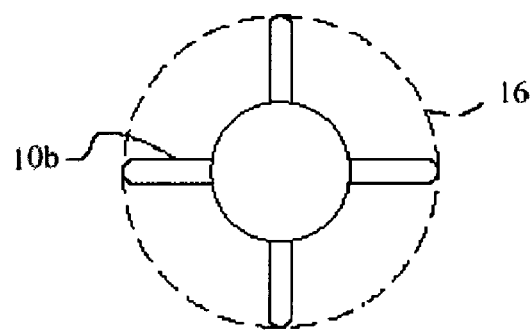
FIG. 15B is a sectional view taken along line 15B—15B in FIG. 15A.

In a tenth embodiment, the transverse cross-sectional shape of second part 10b is like a plus sign (+) as depicted in FIGS. 15A and 15B. Said second part 10b is slideably received with a circular in cross-section second section 16 of a pin-receiving bore.

Figure 15C:
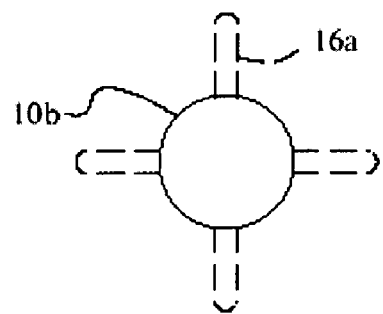
FIG. 15C is a sectional view of the first embodiment of the novel Braille pin when disposed in a pinhole having a "plus-sign" shape.

In a variation of the tenth embodiment, depicted in FIG. 15C, second part 10b has a cylindrical construction and hence a circular transverse cross-section. It is slidingly received in a bore or pinhole having a second section 16a that is plus sign (+) shaped in transverse cross-section.

Figure 16A:
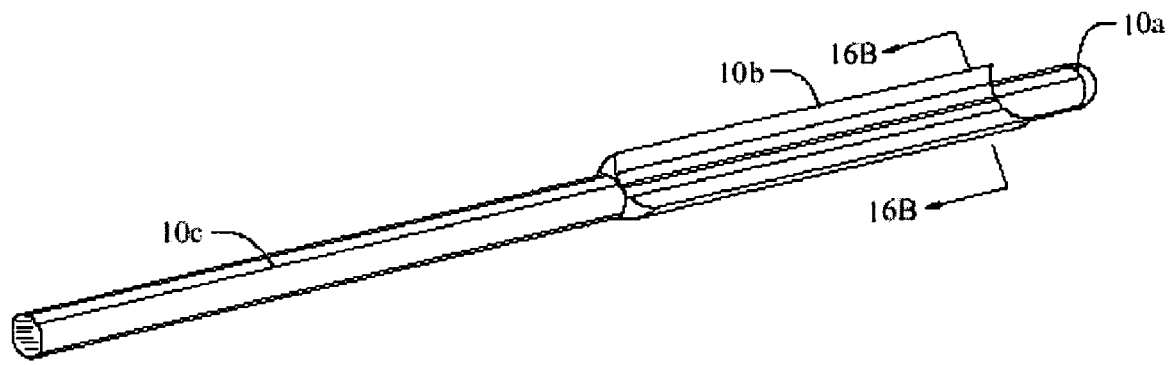
FIG. 16A is a perspective view of an eleventh embodiment of the novel Braille pin.
Figure 16B:
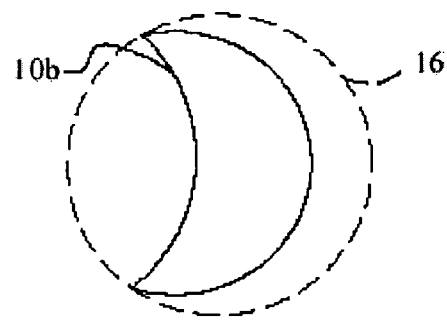
FIG. 16B is a sectional view taken along line 16B—16B in FIG. 16A.

In an eleventh embodiment, the transverse cross-sectional shape of second part 10b is crescent-shaped as depicted in FIGS. 16A and 16B. Said second part 10b is slideably received with a circular in cross-section second section 16 of a pin-receiving bore.

Figure 16C:
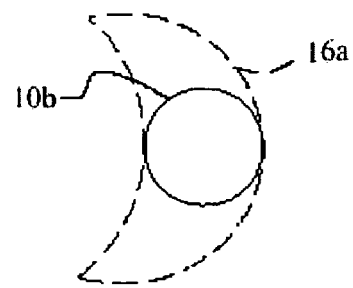
FIG. 16C is a sectional view of the first embodiment of the novel Braille pin when its bearing surface is disposed in a crescent-shaped pinhole.

In a variation of the eleventh embodiment, depicted in FIG. 16C, second part 10b has a cylindrical construction and hence a circular transverse cross-section. It is slidingly received in a bore or pinhole having a second section 16a that is crescent-shaped in transverse cross-section.

Figure 17A:
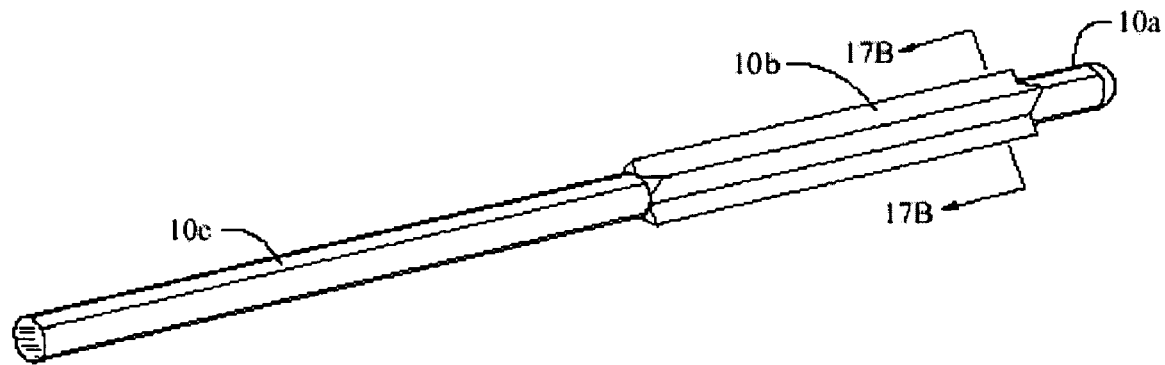
FIG. 17A is a perspective view of a twelfth embodiment of the novel Braille pin.
Figure 17B:
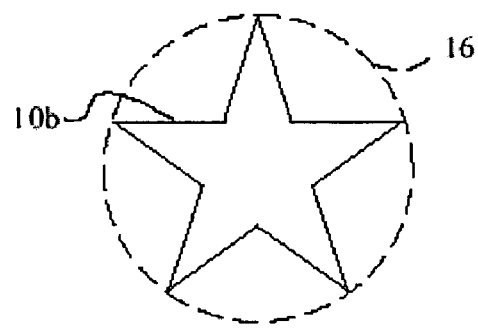
FIG. 17B is a sectional view taken along line 17B—17B in FIG. 17A.

In a twelfth embodiment, the transverse cross-sectional shape of second part 10b is star-shaped as depicted in FIGS. 17A and 17B. Said second part 10b is slideably received with a circular in cross-section second section 16 of a pin-receiving bore.

Figure 17C:
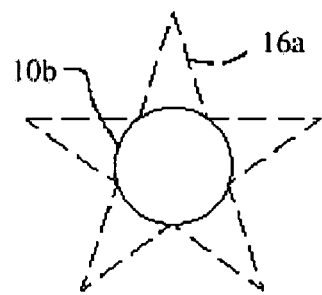
FIG. 17C is a sectional view of the first embodiment of the novel Braille pin when its bearing surface is disposed in a star-shaped pinhole.

In a variation of the twelfth embodiment, depicted in FIG. 17C, second part 10b has a cylindrical construction and hence a circular transverse cross-section. It is slidingly received in a bore or pinhole having a second section 16a that is star-shaped in transverse cross-section.

The star-shaped transverse cross-section of FIGS. 17A and 17B is the transverse cross-sectional shape of pin second part 10b that will be incorporated into a commercial embodiment of the invention.

In summary, second section 10b of each pinhole or bore has a circular cross-section as indicated in phantom lines in FIGS. 8B–17B and a non-circular cross-section as indicated in phantom lines in FIGS. 8C–17C. Accordingly, when second part 10b of Braille pin 10 has a square or other non-circular cross-section, a "square peg in a round hole" phenomena is observed, i.e., the radially outermost edges of the fins or projections make a sliding linear or knife blade-like contact with the annular walls of bore second section 16. Alternatively, when pin second part 10b has a cylindrical cross-section and is slidingly received within a bore or pinhole 16a having a noncircular transverse cross-section, the same phenomenon is observed. In both alternatives, less contact surface area is created than when the transverse cross-section of the pin matches the transverse cross-section of the pinhole due to the decrease in surface area contact. A reduction in contact surface area is also provided when second part 10b has any other non-circular cross-sectional shape such as the shapes mentioned above. The invention is not limited to the shapes specifically listed but includes any non-circular geometric shape.

The reduction in contact surface area reduces the probability that debris can become trapped in the interface between the radially outermost edges of the fins or projections and thus reduces the probability that a pin will be stuck in any position as a result of said trapped debris. The presence of the overhang, however, virtually eliminates the probability of any debris ever working itself into such interface. The device is therefore more tolerant of contaminants or other debris of the type that often causes the cylindrical Braille pins of the prior art to become stuck in their cylindrical bores in an "up" or "down" position or any position therebetween.

The alternative embodiments have the advantage that all Braille pins 10 used therewith have a cylindrical second part 10b but the disadvantage of a large, irregular-shaped second section of a pinhole or bore 16a to accommodate such cylindrical third part with reduced surface contact.

The novel Braille pin provides a quiet actuation. The Braille pin design embodies the use of low durometer materials in areas of impact to reduce the noise from the transition of the Braille dots when the display refreshes.

The novel Braille pins can be constructed of anti-bacterial plastics or employ the use of other anti-bacterial materials to provide a healthier reading environment.

It will thus be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A plurality of Braille pins, comprising:
   a base;
   a straight neck extending from said base;
   said plurality of Braille pins including a first plurality of Braille pins releasably secured to a first side of said neck;
   whereby said plurality of Braille pins is collectively adapted to be inserted into a Braille cell, thereby eliminating a need to individually insert Braille pins of said plurality of Braille pins into said Braille cell.

* * * * *